United States Patent
Harding, Jr. et al.

(10) Patent No.: US 10,552,452 B2
(45) Date of Patent: Feb. 4, 2020

(54) ASYNCHRONOUSLY PROCESSING SEQUENTIAL DATA BLOCKS

(71) Applicant: Alteryx, Inc., Irvine, CA (US)

(72) Inventors: Edward P. Harding, Jr., Boulder, CO (US); Adam David Riley, Orwell (GB); Christopher H. Kingsley, Longmont, CO (US)

(73) Assignee: Alteryx, Inc., Irvine, CA (US)

( * ) Notice: Subject to any disclaimer, the term of this patent is extended or adjusted under 35 U.S.C. 154(b) by 296 days.

(21) Appl. No.: 15/785,357

(22) Filed: Oct. 16, 2017

(65) Prior Publication Data

US 2019/0114353 A1  Apr. 18, 2019

(51) Int. Cl.
| | | |
|---|---|---|
| G06F 16/00 | (2019.01) | |
| G06F 16/27 | (2019.01) | |
| G06F 16/215 | (2019.01) | |
| G06F 16/2455 | (2019.01) | |

(52) U.S. Cl.
CPC .......... *G06F 16/273* (2019.01); *G06F 16/215* (2019.01); *G06F 16/24552* (2019.01)

(58) Field of Classification Search
CPC .......................... G06F 16/273; G06F 16/24552
See application file for complete search history.

(56) References Cited

U.S. PATENT DOCUMENTS

| | | | |
|---|---|---|---|
| 5,832,310 A | 11/1998 | Morrissey et al. | |
| 5,875,454 A | 2/1999 | Craft et al. | |
| 6,564,274 B1 | 5/2003 | Heath et al. | |
| 6,606,704 B1 | 8/2003 | Adiletta et al. | |
| 6,625,671 B1 | 9/2003 | Collette et al. | |
| 8,880,481 B1 | 11/2014 | Harada et al. | |
| 9,183,200 B1 | 11/2015 | Liu et al. | |
| 9,436,558 B1 | 9/2016 | Per et al. | |
| 2004/0236785 A1 | 11/2004 | Greiner | |
| 2005/0008011 A1 | 1/2005 | Georgiou et al. | |
| 2005/0071579 A1 | 3/2005 | Luick | |
| 2006/0217834 A1 | 9/2006 | Shotwell et al. | |
| 2008/0120314 A1 | 5/2008 | Yang et al. | |
| 2008/0243764 A1 | 10/2008 | Meijer et al. | |
| 2009/0144304 A1 | 6/2009 | Stephens et al. | |

(Continued)

OTHER PUBLICATIONS

PCT International Search Report and Written Opinion, PCT Application No. PCT/US18/32557, dated Jul. 27, 2018, eight pages.

(Continued)

*Primary Examiner* — Cheryl Lewis
(74) *Attorney, Agent, or Firm* — Fenwick & West LLP

(57) ABSTRACT

A data analytics system stores a plurality of sequential data blocks in a block cache. Each data block contains one or more data records. Each data record of a data record contains one or more values and a record marker marking the end of the data record. The data analytics system allocates a data block in the block cache to a worker thread. The worker thread parses the data block to identify the one or more data records contained within the data block. The data analytics system determines whether the data block was correctly parsed. Responsive to determining that the data block was correctly parsed, the data analytics system provides the one or more data records contained within the data block to a data analytics workflow.

20 Claims, 8 Drawing Sheets

(56) References Cited

U.S. PATENT DOCUMENTS

| | | | |
|---|---|---|---|
| 2010/0115182 A1 | 5/2010 | Murugesan | |
| 2012/0124045 A1 | 5/2012 | Pendap et al. | |
| 2012/0166752 A1 | 6/2012 | Taniyama | |
| 2012/0310916 A1 | 12/2012 | Abadi et al. | |
| 2013/0138628 A1 | 5/2013 | Bensberg et al. | |
| 2013/0339473 A1 | 12/2013 | McCaffrey et al. | |
| 2014/0297652 A1 | 10/2014 | Stevens et al. | |
| 2014/0337314 A1 | 11/2014 | Potapov et al. | |
| 2015/0113535 A1 | 4/2015 | Goda et al. | |
| 2016/0147450 A1 | 5/2016 | Derby et al. | |
| 2016/0378752 A1 | 12/2016 | Anderson et al. | |
| 2017/0103016 A1 | 4/2017 | Stalzer | |
| 2017/0308470 A1* | 10/2017 | Bagal | G06F 12/0811 |
| 2018/0144015 A1* | 5/2018 | Mittur Venkataramanappa | G06F 16/273 |
| 2018/0246657 A1 | 8/2018 | Sadowski | |
| 2019/0286638 A1* | 9/2019 | Walker | G06F 16/283 |

OTHER PUBLICATIONS

PCT International Search Report and Written Opinion, PCT Application No. PCT/US2018/042257, dated Sep. 21, 2018, 11 pages.
PCT International Search Report and Written Opinion, PCT Application No. PCT/US18/55890, dated Dec. 7, 2018, nine pages.
PCT International Search Report and Written Opinion, PCT Application No. PCT/US18/55898, dated Dec. 26, 2018, nine pages.

* cited by examiner

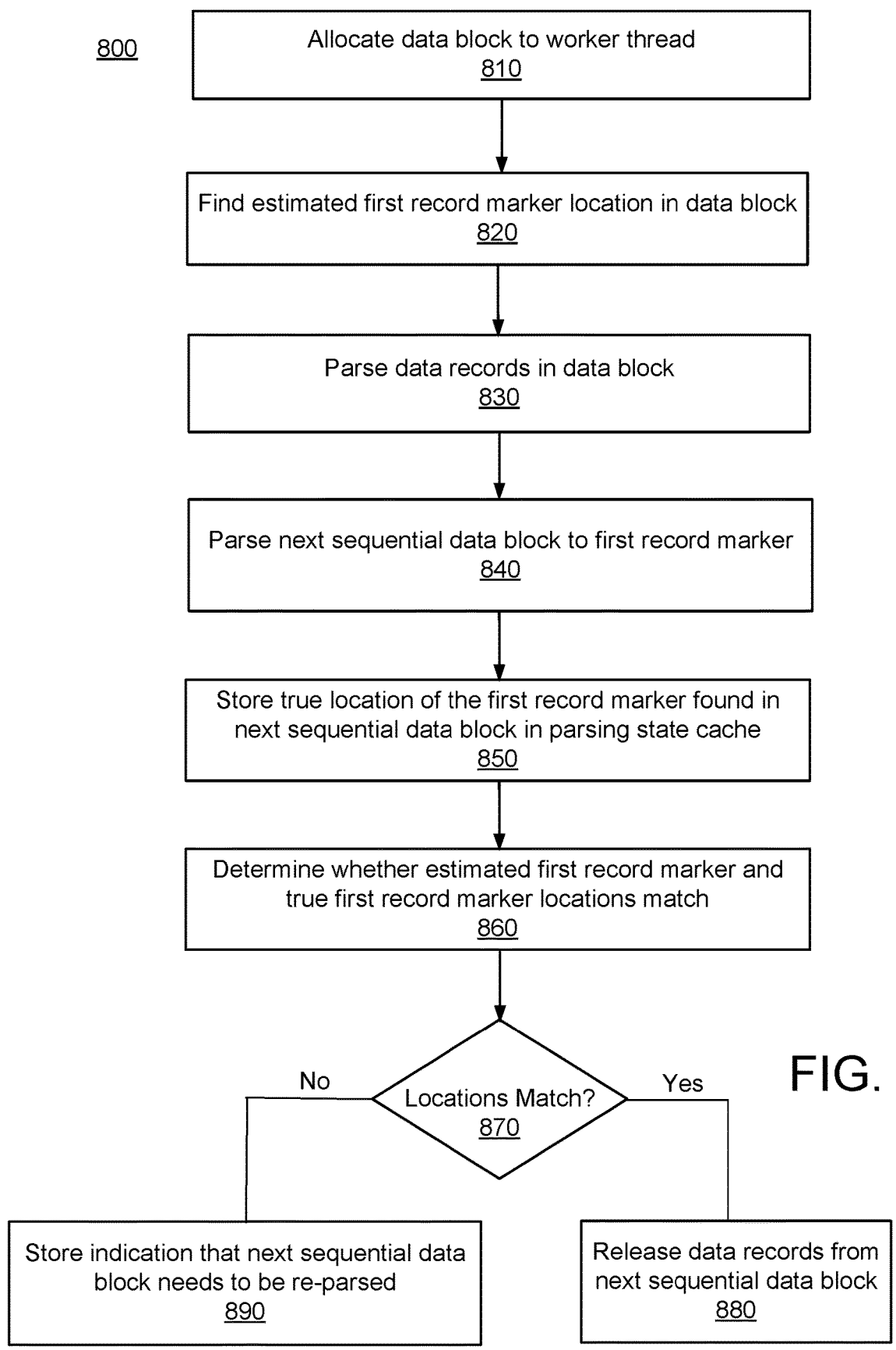

ASYNCHRONOUSLY PROCESSING SEQUENTIAL DATA BLOCKS

BACKGROUND

Field of Art

The described embodiments pertain in general to processing data in a computer system, and in particular to asynchronously processing blocks of data retrieved from a storage device.

Description of the Related Art

Data analytics involves extracting information having business value from large data sets. For example, a small business may utilize a third-party data analytics environment employing dedicated computing and human resources to gather, process, and analyze vast amounts of data from various sources, such as external data providers, internal data sources (e.g., files on local computers), Big Data stores, and cloud-based data (e.g., social media information). Processing such large data sets, as used in data analytics, in a manner that extracts useful quantitative and qualitative information typically requires complex software tools implemented on powerful computing platforms.

In addition, efficient data processing techniques are needed to access, process, and analyze the large sets of data from differing data sources. Otherwise, performance bottlenecks can occur and impede the function of the data analytics platform, delay the processing of the data, and reduce the quality of information extracted from the data. For example, the throughput at which data records are processed for input into the data analytics system is an important consideration. If the data records are processed slowly, the parts of the data analytics platform that consume the data records may need to wait for the records, leading to delays throughout the platform.

SUMMARY

The above and other issues are addressed by a method, computer-implemented data analytics system, and computer-readable memory for processing data blocks in a data analytics system. An embodiment of the method includes storing a plurality of sequential data blocks in a block cache. Each data block contains one or more data records. Each data record contains one or more values and a record marker marking the end of the data record. The method further includes allocating a data block in the block cache to a worker thread. The method further includes parsing, by the worker thread, the data block to identify the one or more data records contained within the data block. The method further includes determining whether the data block was correctly parsed. The method also includes providing the one or more data records contained within the data block to a data analytics workflow executing on the data analytics system responsive to determining that the data block was correctly parsed.

An embodiment of the computer-implemented data analytics system includes a computer processor for executing computer program instructions. The system also includes a non-transitory computer-readable memory storing computer program instructions executable by the computer processor to perform operations. The operations include storing a plurality of sequential data blocks in a block cache. Each data block contains one or more data records. Each data record contains one or more values and a record marker marking the end of the data record. The operations further include allocating a data block in the block cache to a worker thread. The operations further include parsing, by the worker thread, the data block to identify the one or more data records contained within the data block. The operations further include determining whether the data block was correctly parsed. The operations also include providing the one or more data records contained within the data block to a data analytics workflow executing on the data analytics system responsive to determining that the data block was correctly parsed.

An embodiment of the non-transitory computer-readable memory stores executable computer program instructions. The instructions are executable to perform operations. The operations include storing a plurality of sequential data blocks in a block cache. Each data block contains one or more data records. Each data record contains one or more values and a record marker marking the end of the data record. The operations further include allocating a data block in the block cache to a worker thread. The operations further include parsing, by the worker thread, the data block to identify the one or more data records contained within the data block. The operations further include determining whether the data block was correctly parsed. The operations also include providing the one or more data records contained within the data block to a data analytics workflow executing on the data analytics system responsive to determining that the data block was correctly parsed.

BRIEF DESCRIPTION OF DRAWINGS

FIG. 8 is a flow chart illustrating a method of parsing data blocks according to one embodiment.

The figures depict various embodiments for purposes of illustration only. One skilled in the art will readily recognize from the following discussion that alternative embodiments of the structures and methods illustrated herein may be employed without departing from the principles of the embodiments described herein. Like reference numbers and designations in the various drawings indicate like elements.

DETAILED DESCRIPTION

Figure 1:
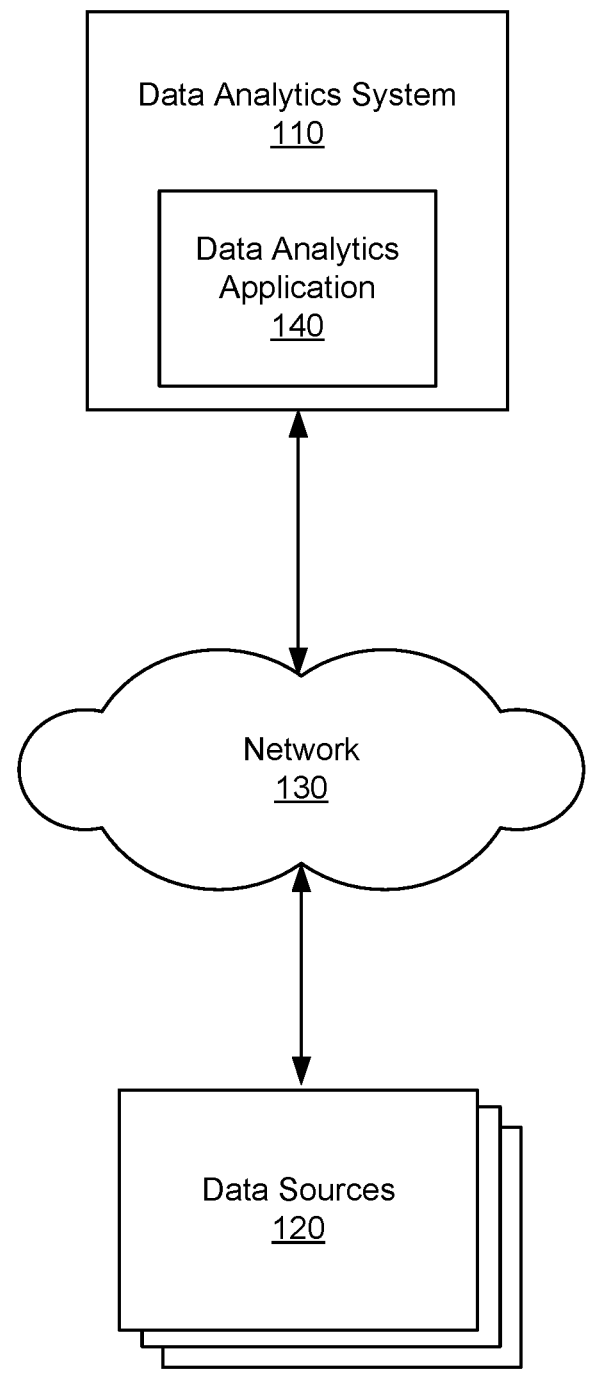
FIG. 1 is a block diagram illustrating a data analytics environment including a data analytics system according to one embodiment.

FIG. 1 is a block diagram illustrating a data analytics environment 100 including a data analytics system 110 according to one embodiment. The environment 100 further includes multiple data sources 120 connected to the data analytics system 110 via a network 130. Although the illustrated environment 100 contains only one data analytics system 110 coupled to multiple data sources 120, embodiments can have multiple data analytics systems and a singular data source.

The data sources 120 provide electronic data to the data analytics system 110. A data source 120 may be a storage device such as a hard disk drive (HDD) or solid-state drive (SSD), a computer managing and providing access to multiple storage devices, a storage area network (SAN), a database, or a cloud storage system. A data source 120 may also be a computer system that can retrieve data from another source. The data sources 120 may be remote from the data analytics system 110 and provide the data via the network 130. In addition, some or all data sources 120 may be directly coupled to the data analytics system and provide the data without passing the data through the network 130.

The data provided by the data sources 120 is typically organized into data records, which each data record including one or more values. For example, a data record provided by a data source 120 may include a series of comma-separated values. The data describe information of relevance to an enterprise using the data analytics system 110. For example, data from a data source 120 can describe computer-based interactions (e.g., click tracking data) with content accessible on websites and/or with social media applications.

The data analytics system 110 is a computer-based system utilized for processing and analyzing large amounts of data. The data are collected, gathered, or otherwise accessed from the multiple data sources 120 via the network 130. The data analytics system 110 can implement scalable software tools and hardware resources employed in accessing, preparing, blending, and analyzing data from a wide variety of data sources. For instance, the data analytics system 110 supports the execution of data intensive processes and workflows. The data analytics system 110 can be a computing device used to implement data analytics functions including the asynchronous data processing techniques described herein.

The data analytics system 110 can be configured to support one or more software applications, illustrated in FIG. 1 as a data analytics application 140. The data analytics application 140 processes and analyzes large amounts of data obtained from one or more of the data sources 120. In some cases, the data analytics application 140 provides software that supports network, or cloud-based, access to data analytic tools and macros by multiple end users. As an example, the data analytics application 140 allows users to share, browse, and consume analytics in a manner similar to a mobile application store or other cloud-based service. Analytic data, macros, and workflows can be packaged and executed as a smaller scale and customizable analytic application (i.e., an app), for example, that can be accessed by other users of the data analytics system 110. In some cases, access to published analytic apps can be managed by the data analytics system 110, namely granting or revoking access, and thereby providing access control and security capabilities. The data analytics application 140 can perform functions associated with analytic apps such as creating, deploying, publishing, iterating, updating, and the like. Additionally, the data analytics application 140 can support functions performed at various stages involved in data analytics, such as the ability to access, prepare, blend, analyze, and output analytic results.

The data analytics application 140 can also support a software tool to design and execute repeatable workflows, via a visual graphical user interface (GUI). As an example, a GUI associated with the data analytics application 140 offers a drag-and-drop workflow environment for data blending, data processing, and advanced data analytics. Moreover, a workflow can include a series of data processing tools that perform specific processing operations or data analytics functions. Each tool that is part of a workflow performs a function related to data that is specific to the tool. As an example, a workflow can include tools implementing various data analytics functions including one or more of the following: input/output; preparation; join; predictive; spatial; investigation; and parse and transform operations. More details about workflow are described in conjunction with FIG. 2.

The data analytics application 140 reads blocks of data from the data sources 120. For example, the data analytics application 140 may read blocks of data from a SSD. The data analytics application 140 processes each data block to extract data records contained therein. These data records are processed by the data analytics workflow implemented by the data analytics application 140.

In one embodiment, the data analytics application 140 asynchronously processes multiple blocks of data received from a data source 120. The data analytics application 140 uses multiple worker threads executing in parallel to simultaneously process the data blocks to produce the data records. Each data block typically includes multiple data records, and the boundaries of the data records are often not aligned with the boundaries of the data blocks. Hence, a data record may span two adjacent blocks. Moreover, the threads can process the data blocks out of order, and different threads may process adjacent blocks.

The data analytics application 140 accounts for data records that span adjacent blocks by speculatively processing certain data records and subsequently confirming that the processing was correct. If the speculative processing is incorrect, only the parts of the data records that were processed incorrectly need to be re-processed. This technique, described in more detail below, allows the data analytics application 140 to process the data blocks into data records and provide the data records to the data analytics workflow at a high throughput. The throughput is 2.0 GB/sec in one embodiment, compared to approximately 0.1 GB/sec using other techniques. In fact, the technique can typically support a sustained data transfer equal to the rate at which the data source 120 can physically provide the data blocks. The technique allows the data analytics application 140 to operate efficiently, without suffering performance penalties due to delays in processing the data blocks.

The network 130 represents the communication pathways between the data analytics systems 110 and data sources 120. In one embodiment, the network 130 is the Internet and uses standard communications technologies and/or protocols. Thus, the network 130 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
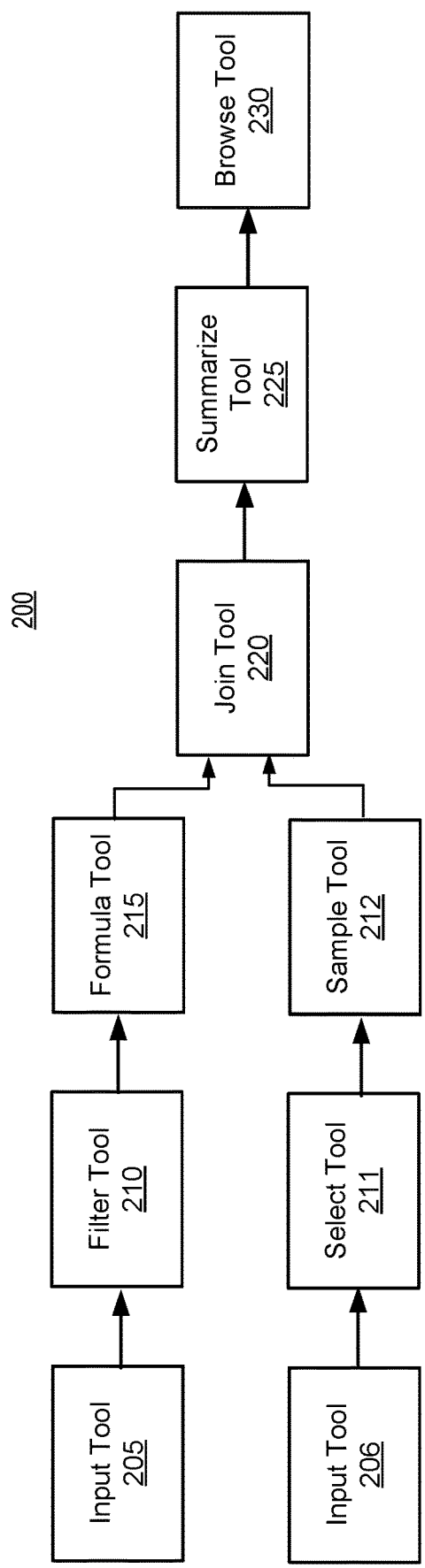
FIG. 2 is a block diagram illustrating a workflow created using the data analytics system to process data according to one embodiment.

FIG. 2 is a block diagram illustrating a workflow 200 created using the data analytics system 110 to process data according to one embodiment. In one embodiment, the workflow 200 is created using a visual workflow environment supported by a GUI of the data analytics system 110. The visual workflow environment enables a set of drag and drop tools that eliminate the need for providing software code to design a workflow and eliminate the need to identify complex formulas to be implemented by the workflow. In another embodiment, the workflow 200 is created and described in a document, such as an extensible markup language (XML) document. The workflow 200 is executed by a computer device of the data analytics system 110. However, in other embodiments, the workflow 200 is deployed to another computer device that may be communicatively connected, via a network (e.g., network 130), to the data analytics system 110.

A workflow can include a series of tools that perform specific processing operations or data analytics functions. As a general example, tools of a workflow can perform one or more of the following data analytics functions: input/output; preparation; join; predictive; spatial; investigation; and parse and transform operations. Implementing a workflow can involve defining, executing, and automating a data analytics process, where data is passed to each tool in the workflow, and each tool performs its respective processing operation on the received data. A packet including an aggregated group of individual records can be passed through the tools of a workflow, which allows for the individual processing operations to operate more efficiently on the data. Such aggregation techniques can increase the speed of developing and running workflows, even with processing large amounts of data. A workflow can define, or otherwise structure, a repeatable series of operations, specifying an operational sequence of the specified tools. In some cases, the tools included in a workflow are performed in a linear order. In other cases, multiple tools execute in parallel.

As illustrated, the workflow 200 of FIG. 2 includes input/output tools, illustrated as input tools 205 and 206 and a browse tool 230. The input tools 205 and 206 function to access records from particular data sources 120. The input tools 205 and 206 bring into the workflow the accessed records and provide the records to the subsequent tools of the workflow 200. In this example, the input tool 205 provides accessed records to a filter tool 210 and the input tool 206 provides accessed records to a select tool 211. The browse tool 230 is located at the end of the workflow 200 and receives the output resulting from the execution of each of the upstream tools of the workflow 200. Although the browse tool 230 is located at the end of the workflow 200 in this example, the browse tool 230 can be added at any point in a workflow to review and verify results from execution of upstream tools of the workflow.

In continuing with the example of FIG. 2, the workflow 200 includes preparation tools, shown as the filter tool 210, the select tool 211, a formula tool 215, and a sample tool 212. The filter tool 210 queries records based on an expression and splits the data into two streams, a true stream that includes records that satisfy the expression and a false stream that includes records that do not satisfy the expression. The select tool 211 can be used to select, deselect, reorder and rename fields, change field type or size, and assign a description. The formula tool 215 creates or updates fields using one or more expressions to perform a broad variety of calculations and/or operations. The sample tool 212 limits a received stream of records to a number, percentage, or random set of records. The workflow 200 also includes a join tool 220 that blends multiple data sources. Specifically, the join tool 220 combines two input data streams based on common fields (or record position).

The workflow 200 of FIG. 2 is also shown to include a summarize tool 225 which is a parse and transform tool that can restructure and re-shape data to a format used in further analysis. The summarize tool 225 can also perform summarization of data by grouping, summing, counting, spatial processing, and string concatenation. In one embodiment, the output generated by the summarize tool 225 contains the results of the calculation(s).

In some embodiments, execution of the workflow 200 will cause the input tool 205 to pass records one at a time through the filter tool 210 and the formula tool 215, until all records are processed and have reached the join tool 220. Thereafter, the input tool 206 will begin passing records one at a time through the select tool 211 and sample tool 212, until the records are passed to the same join tool 220. Some individual tools of the workflow 200 can possess the capability to implement their own parallel operation, such as initiating a read of a block of data while processing the last block of data or breaking computer-intensive operations, such as a sort tool, into multiple parts. However, in some existing workflow techniques, each record from a set of records is individually processed by each tool of the workflow one record at a time, in a pipeline fashion, until a tool in the workflow is reached that requires multiple records to perform the processing operation (e.g., sort tool, join tool, summarize tool, etc.)

Figure 3:
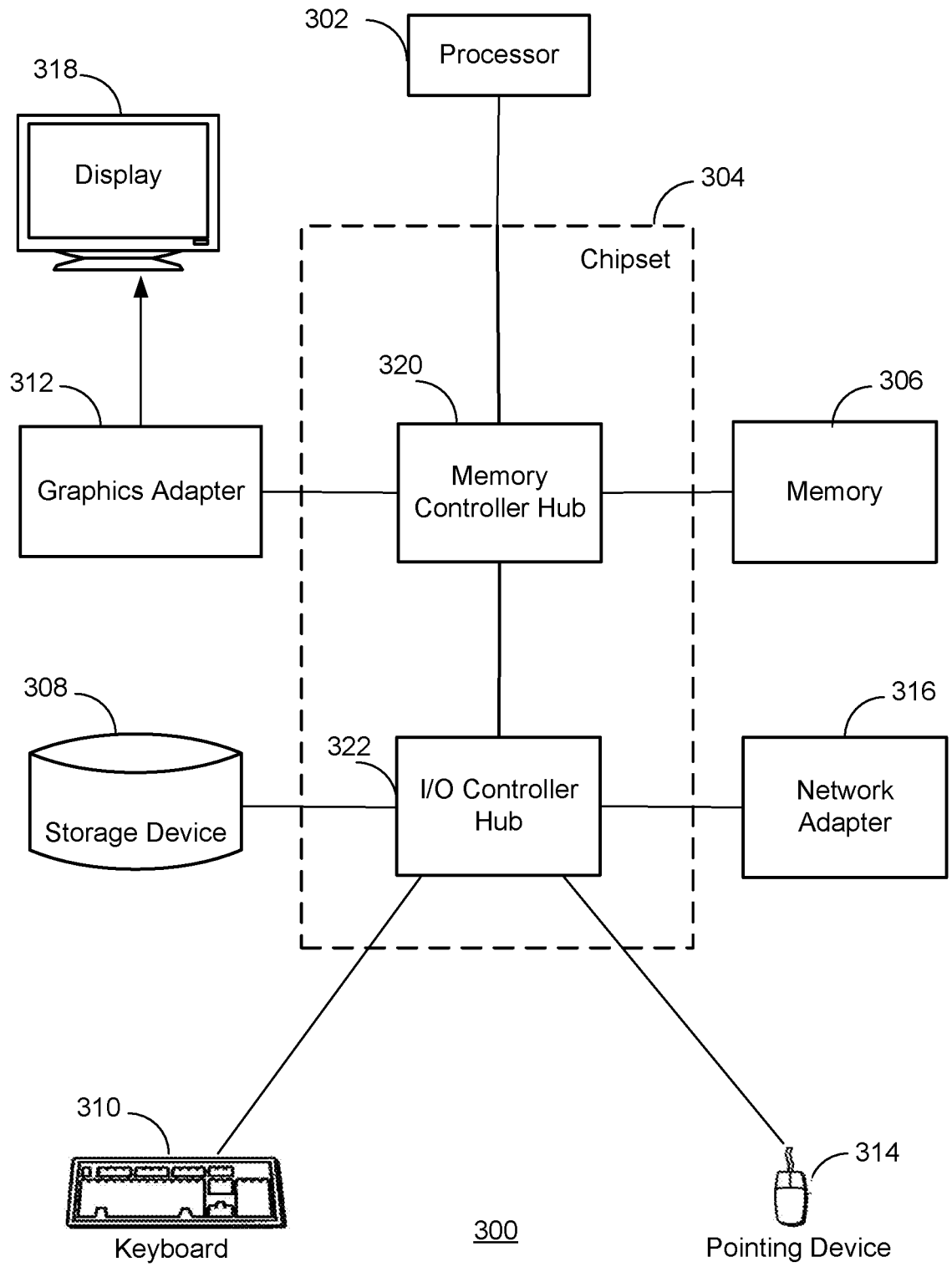
FIG. 3 is a high-level block diagram illustrating a functional view of a typical computer system for use as the data analytics system of FIG. 1 according to an embodiment.

FIG. 3 is a high-level block diagram illustrating a functional view of a typical computer system 300 for use as the data analytics system 110 of FIG. 1 according to an embodiment. The computer system 300 can execute the data analytics application 140 to implement the workflow of FIG. 2.

The illustrated computer system includes at least one processor 302 coupled to a chipset 304. The processor 302 can include multiple processor cores on the same die. The chipset 304 includes a memory controller hub 320 and an input/output (I/O) controller hub 322. A memory 306 and a graphics adapter 312 are coupled to the memory controller hub 320 and a display 318 is coupled to the graphics adapter 312. A storage device 308, keyboard 310, pointing device 314, and network adapter 316 may be coupled to the I/O controller hub 322. In some other embodiments, the computer system 300 may have additional, fewer, or different components and the components may be coupled differently. For example, embodiments of the computer system 300 may lack displays and/or keyboards. In addition, the computer system 300 may be instantiated as a rack-mounted blade server or as a cloud server instance in some embodiments.

The memory 306 holds instructions and data used by the processor 302. In some embodiments, the memory 306 is a random-access memory. The storage device 308 is a non-transitory computer-readable storage medium. The storage device 308 can be a HDD, SSD, or other types of non-transitory computer-readable storage medium. Data processed and analyzed by the data analytics system 110 can be stored in the memory 306 and/or the storage device 308.

The pointing device 314 may be a mouse, track ball, or other type of pointing device, and is used in combination with the keyboard 310 to input data into the computer system 300. The graphics adapter 312 displays images and other information on the display 318. In some embodiments, the display 318 includes a touch screen capability for receiving user input and selections. The network adapter 316 couples the computer system 300 to the network 130.

The computer system 300 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 308, loaded into the memory 306, and executed by the processor 302.

Figure 4:
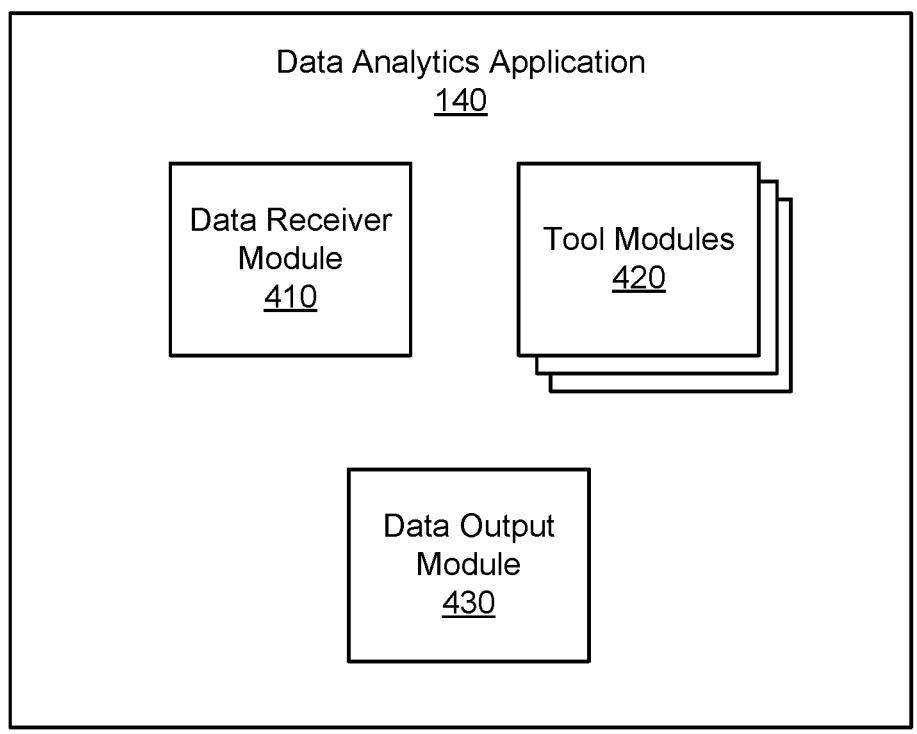
FIG. 4 is a block diagram illustrating a more detailed view of a data analytics application of the data analytics system according to one embodiment.

FIG. 4 is a block diagram illustrating a more detailed view of the data analytics application 140 of the data analytics system 110 according to one embodiment. The data analytics application 140 includes a data receiver module 410, tool modules 420, and a data output module 430. Those of skill in the art will recognize that other embodiments can have different and/or other components than the ones described here, and that the functionalities can be distributed among the components in a different manner.

The data receiver module 410 receives data from the data sources 120. In one embodiment, the data receiver module 410 receives data blocks from a data source and parses the data blocks to produce data records. For example, the data receiver module 410 may receive data blocks read from a SSD, where each data block includes multiple data records, and some data records may span multiple data blocks. The data receiver module 410 passes the data records to the other modules within the data analytics application 140.

The tool modules 420 provide a set of data processing tools that perform specific processing operations or data analytics functions including one or more of the following: input/output; preparation; join; predictive; spatial; investigation; and parse and transform operations. The tools operate on the data records received from the data sources 120 by the data receiver module 410. The tool modules 420 provide the tools included in the workflow 200 described in conjunction with FIG. 2.

The data output module 430 outputs the results of the processing performed by the data analytics application 140. That is, the data output module 430 receives the processed data records produced by execution of the workflow 200 and makes the data records available to other systems and/or human reviewers. For example, the data output module 430 may provide a GUI by which a human reviewer associated with an enterprise can review the output of the workflow 200 resulting from processing data records associated with the enterprise.

Figure 5:
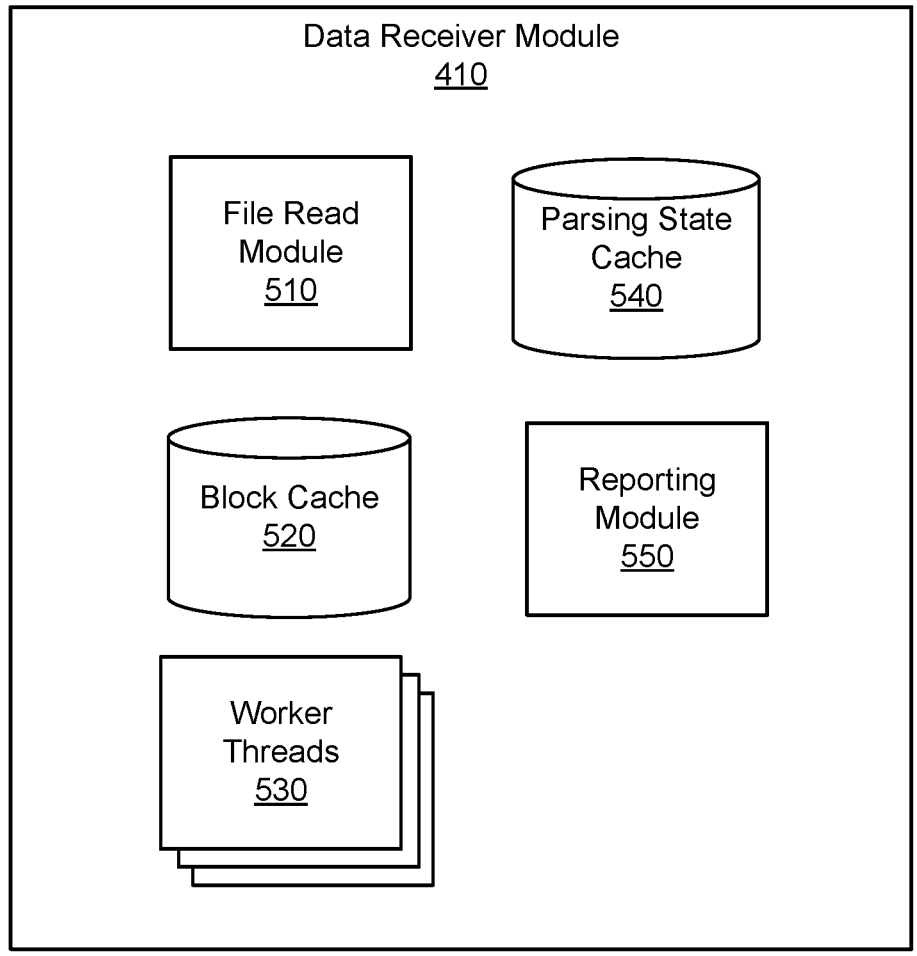
FIG. 5 is a block diagram illustrating a more detailed view of a data receiver module of the data analytics application according to one embodiment.

FIG. 5 is a block diagram illustrating a more detailed view of the data receiver module 410 of the data analytics application 140 according to one embodiment. The data receiver module 410 includes a file read module 510, a block cache 520, multiple worker threads 530, a parsing state cache 540, and a reporting module 550. Those of skill in the art will recognize that other embodiments can have different and/or other components than the ones described here, and that the functionalities can be distributed among the components in a different manner.

The file read module 510 reads files comprised of data blocks from data sources 120 and manages processing of the data blocks. For example, the file read module 510 may read one or more files from a SSD. The file is stored on the data source 120 as a set of sequential data blocks. The size of the blocks may vary and in one embodiment is 256 KB. The file read module 510 reads the file by sending one or more input/output (I/O) requests for particular data blocks of the file to the data source 120. In one embodiment, the file read module 510 requests all of the blocks in the file in sequential order by simultaneously issuing many separate I/O requests, with each request requesting a particular block. For example, the file read module 510 may simultaneously issue a batch of 100 I/O requests for the first 100 blocks of the file, and issue additional requests for the next sequential blocks as requests in the first batch are fulfilled. Although the I/O requests request the blocks in sequential order, the data source 120 may complete the requests in a different order and return non-sequential blocks.

The file read module 510 stores the data blocks returned by the data sources 120 in the block cache 520. The block cache 520 stores the blocks while the blocks are processed by the worker threads 530. In one embodiment, the block cache 520 has a fixed size and thus holds a fixed number of blocks. In addition, the file read module 510 manages the block cache 520 such that a given block (identified by its sequence number) is guaranteed to be in a specific location in the block cache. This position is calculated as the block's sequence number modulo the number of blocks that can be held in the block cache 520.

Managing the block cache 520 in this way reduces the resource contention that can occur during the asynchronous parallel processing of the blocks by the worker threads 530. Since the block cache 520 is a fixed size and a block, if it is in the cache, is at a known location, there is no need to hold a global lock on the cache. Each block in the cache contains three atomic variables that facilitate management of that block independently of the other blocks: 1) a count of the number of worker threads referencing that block; 2) the sequence number of the block represented by that cache location at a given time; and 3) the status (e.g., available, pending, unused, deallocated) of the cache location in which the block is located. These variables allow the availability of a given block in the cache to be determined in constant time without needing to acquire a lock.

The file read module 510 passes blocks in the block cache 520 to worker threads 530 for processing. There are multiple independently-executing worker threads 530. Each thread may execute on a separate processor core of the processor 302. The worker threads 530 parse the data blocks in the block cache 520 to extract the data records contained therein.

The worker threads 530 parse single data blocks at a time and the multiple threads collectively process multiple blocks simultaneously. A given thread 530 requests a data block from the block cache 530 by making a "get any block" request using an application programming interface (API) provided by the file read module 510. The thread 530 receives a block (equivalently, a pointer or reference to a block) in the block cache 520 in response to the request. The block received in response to this API call is one that has not been processed by another thread; the block is not necessarily sequentially-related to a previous block processed by the thread. The API call may also return a message indicating that no blocks are currently available for processing. In this case the thread may perform other tasks while it waits for a block to become available.

A worker thread 530 parses a data block by reading the block sequentially from beginning to end to identify data records, and portions of data records, contained therein. In one embodiment, each data record contains a set of delineated data values and is terminated by a record marker. For example, a data record may contain a set of comma-separated values (CSVs). The record marker is a special value or values that marks the end of the record, such as a line feed character or a carriage return character followed by a line feed character. Thus, the worker thread 530 parses a data record starting at the position immediately after a record marker and extending to the next record marker. A given data block may hold multiple records, and a data record may span multiple data blocks.

The parsing state cache 540 stores information describing data blocks parsed by the worker threads 530. In one embodiment, the parsing state cache 540 holds data objects corresponding to the data blocks being parsed by the worker threads 530. The information in a data object includes the estimated location of the first record marker and the true location of the first record marker in an associated data block, as well as the parsed data records starting within the block. The information in a data object may also indicate whether the associated data block was parsed correctly, and whether the data block needs to be re-parsed. The worker threads 530 update the information in the objects as the threads parse the data blocks.

In operation, a worker thread 530 makes a "get any block" API call to the file read module 510 in order obtain a data block from the block cache 520. The worker thread 530 then scans the data block in sequential order to find the first record marker. The worker thread 530 parses the data block to the end, starting with the data record immediately after the first record marker. The worker thread 530 stores the parsed data records in the associated object in the parsing state cache 540. The worker thread 530 also records the location of the first record marker found in the data block in the parsing state cache 540.

This recorded location is said to be the "estimated" first record marker in the data block because there is a chance that this location was incorrectly detected due to the worker thread only having partial context for the record ending at that location. For example, in some CSV files the data may be enclosed in quotation marks. A line feed character enclosed in quotation marks is therefore data within a record, and not a record marker. A worker thread 530 that parses the record does not know whether the prior record ended with quoted text and, therefore, might incorrectly parse the line feed character as a record marker even though the character is part of a quotation.

Once the worker thread 530 parses to the end of the data block, the worker thread makes a "get next block" API call to the file read module 510. This call requests the next sequential data block, i.e., the data block sequentially following the block that the worker thread 530 just parsed. In addition, the "get next block" API call releases the prior block that the worker thread parsed.

The worker thread 530 receives the requested next sequential data block, and parses this block from the beginning to the first record marker. The parsed data are appended to the data record parsed at the end of the preceding data block and stored in the parsing state cache 540. In addition, the worker thread 530 records the location of the first record marker in the parsing state cache object corresponding to the next sequential block. This location is recorded in the parsing state object as the true location of the first record marker in the block. That is, the location is known to be accurate because the worker threat has the full context for the record ending at this location.

In one embodiment, the worker thread 530 determines whether the true first record marker location matches the estimated first record marker location for the data block (i.e., for the next sequential data block). If the locations match, then this means that the estimated first record marker location is correct, and the data block was parsed correctly. In this case, the worker thread 530 stores an indication in the parsing state cache object for the block indicating that the block was parsed correctly.

If the true first record marker location does not match the estimated first record marker location, then this means that the data block was not parsed correctly. In this case, the worker thread 530 stores an indication in the parsing state cache object for the block indicating that the block was parsed incorrectly and needs to be re-parsed. In one embodiment, the worker thread 530 makes an API call to the file read module 510 flagging the data block as needing to be parsed again. The file read module 510 can then assign a worker thread 530 to parse the data block using the correct first record marker location.

The file read module 510 uses the information in the block cache 520 and the parsing state cache 540 to release data records to the tool modules 420 of the workflow 200. In one embodiment, the file read module 510 releases the data records of a given block from the block cache 520 once there are no worker threads using the block, all previous blocks in the file have been released, and the parsing state cache 540 indicates that the block was parsed correctly. The file read module 510 also releases the data block from the block cache 520 at the same time. The file read module 510 thus essentially uses the block cache 520 as a sliding window that moves across the entire file, preloading blocks (via the file read module I/O requests) for the worker threads 530 and freeing the blocks once processing of the blocks is complete. The file read module 510 meets the needs of many independent worker threads efficiently and uses less memory than other solutions, thereby improving the performance of the data analytics system 110 and application 140.

The reporting module 550 selectively outputs messages when records are released. The messages are output to another component of the data analytics application 140, e.g., to a specific tool module 420. In one example, the reporting module 550 outputs a message when a specific record is released, and/or when all records prior to the specific record are released. The reporting module 550 thus provides a facility to notify components of the data analytics application 140 when specific records are released or other events occur.

Figure 6:
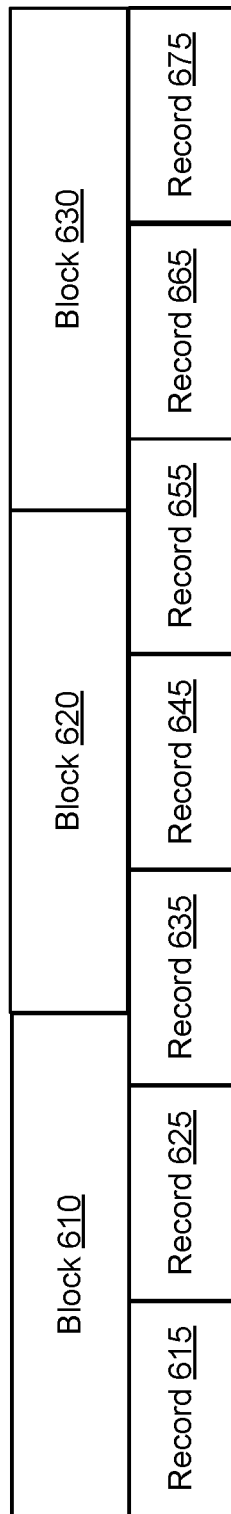
FIG. 6 is a diagram illustrating an example relationship between data blocks and data records.

FIG. 6 is a diagram illustrating an example relationship between data blocks and data records. FIG. 6 illustrates three sequential data blocks 610, 620, and 630 and seven sequential data records, 615, 625, 635, 645, 655, 665, and 675. The data records are not completely aligned with the data blocks. For example, data block 610 includes all of records 615 and 625, and part of record 635. Record 635 starts in block 610 and ends midway through block 620. A worker thread 530 parsing block 620 would initially read part of data record 635, then read the record marker for record 635, then read all of record 645 including its record marker, then read part of record 655.

Assume that the file read module 510 allocates block 620 to a worker thread 530. The worker thread 530 parsing block 620 scans the data block until it finds the record marker marking the end of record 635. The worker thread 350 records the location of the record marker in the parsing state cache object corresponding to block 620 as the estimated first record marker location for this block. Then it parses the data block 620 starting with record 645 (beginning immediately after the first record marker location) through the end of the block, storing the parsing results in the parsing state cache object for the block.

While parsing data block 620, the worker thread 530 parses part of data record 655 through the end of data block 620. The worker thread 530 then requests and obtains data block 630, and releases data block 620. The worker thread 530 parses data block 630 from the beginning until it reaches the record marker indicating the end of record 655 (i.e., the first record marker in the data block). The parsed data from block 630 are appended to the data of record 655 from block 620, thereby forming a complete data record and this information is stored in the parsing state cache object for block 620. The worker thread 530 records the marker marking the end of record 655 as the true first record marker location for block 630 in the parsing state cache object corresponding to the block.

The worker thread 530 determines whether the estimated first record marker location for block 630 (which was recorded in the parsing state cache object by a different worker thread) matches the true first record marker location for the block. If the locations match, the worker thread 530 stores an indication in the parsing state cache object for block 630 indicating that the block was parsed correctly. If the locations do not match, the worker thread 530 makes an API call to the file read module 510 flagging data block 630 as needing to be parsed again from the true first record marker location.

Figure 7:
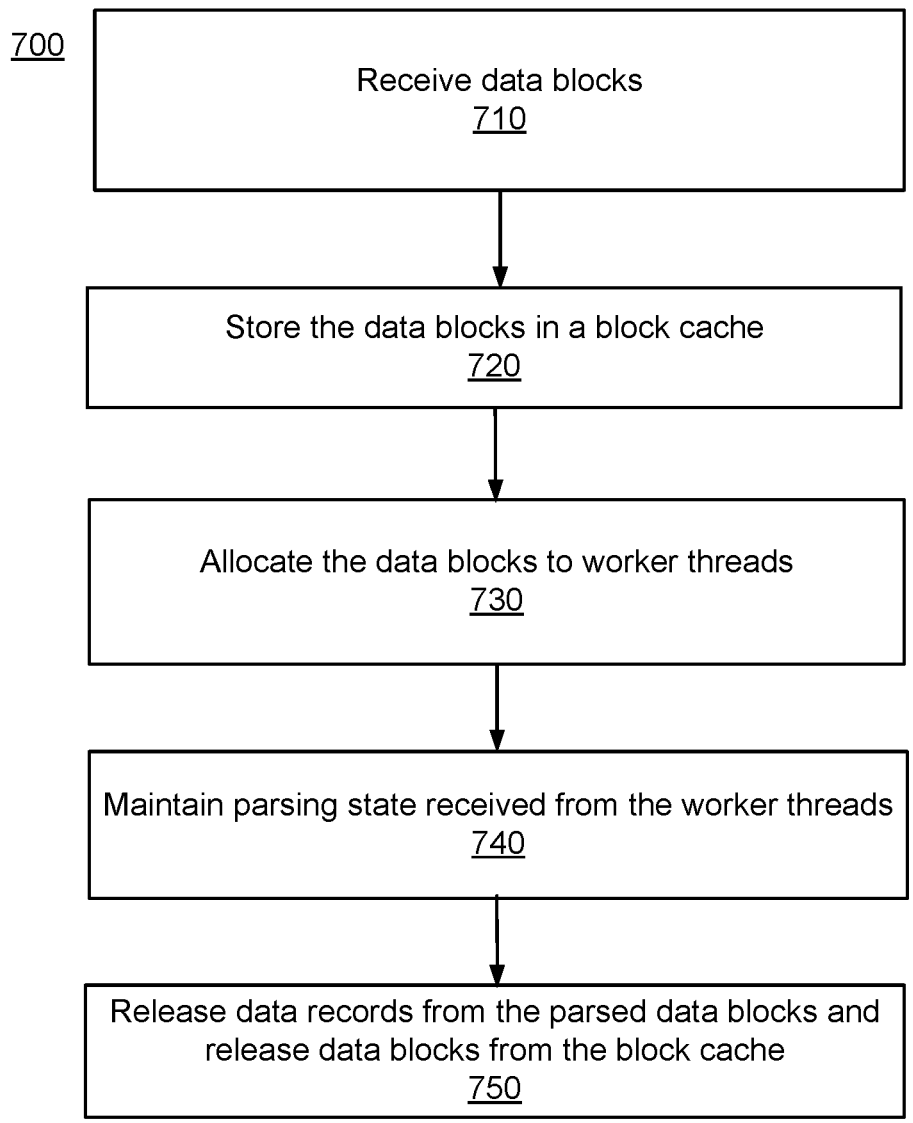
FIG. 7 is a flow chart illustrating a method of processing data blocks received from a data source according to one embodiment.

FIG. 7 is a flow chart illustrating a method 700 of processing data blocks received from a data source 120 according to one embodiment. In some embodiments, the method is performed by the data receiver module 410, although some or all of the operations in the method may be performed by other entities in other embodiments. In some embodiments, the operations in the flow chart are performed in different orders and include different and/or additional steps.

The data receiver module 410 receives 710 the data blocks from the data source 120. For example, the data receiver module 410 may receive the data blocks in response to I/O requests issued to a SSD. While the data blocks are sequential, the data receiver module 410 may receive 710 the blocks out of order. The data receiver module 410 stores 720 the data blocks in the block cache 520. The data receiver module 410 allocates 730 the blocks to worker threads 530. Each data block is allocated to an individual worker thread 530. The worker thread 530 parses the data block, and the multiple worker threads collectively parse multiple data blocks in parallel. The data receiver module 410 maintains 740 parsing state information describing the parsing activity of the worker threads 530 in a parsing state cache 540. The data receiver module 410 releases 750 data records from the parsed data blocks to the data analytics workflow, and releases the data blocks from the block cache 520, based on information in the block cache and parsing state cache 540. While not shown in FIG. 7, the data receiver module 410 may receive more data blocks from the data source 120 as data blocks are released from the block cache 520.

FIG. 8 is a flow chart illustrating a method 800 of parsing data blocks according to one embodiment. In some embodiments, the method is performed by components of the data receiver module 410, including the file read module 510 and the worker threads 530. Some or all of the operations in the method may be performed by other entities in other embodiments. In some embodiments, the operations in the flow chart are performed in different orders and can include different and/or additional steps.

The file read module 510 allocates 810 a data block in the block cache 520 to a worker thread 530. The worker thread 530 scans the data block in sequential order to find 820 the estimated location of the first record marker within it. The worker thread 530 parses 830 the data records in the data block, starting immediately after the first record marker. The worker thread 530 saves the parsing results in a parsing state cache object for the data block. The worker thread 530 also saves the location of the first record marker in the object as the estimated first record marker location for that data block.

The worker thread 530 obtains the next sequential data block and parses 840 that block to the first record marker. The worker thread 530 stores the parsed record with the remainder of the data from that record in the parsing state cache object for the previous data block. In addition, the worker thread 530 stores 850 the location of the first record marker in the parsing state cache 540 as the true first record marker location for the next sequential data block.

The worker thread 530 also determines 860 and 870 whether the true first record location in the next sequential data block matches the estimated first record location that was stored in the parsing state cache object for that data block by another worker thread. If the two locations do not match, the worker thread 530 stores 890 an indication in the parsing state cache object for the block indicating that it was parsed incorrectly and needs to be re-parsed. The file read module 510 will detect the indication and allocate the block to a worker thread 530 for parsing using the true first record location. If the two locations do match, then the next sequential data block was parsed correctly and the file read module 510 will release the data records from the block to the tool modules 420. The previous data block, which was parsed by the worker thread 530 at step 830, will also be released once the estimated first record marker location for that block is verified.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer implemented method of processing data blocks in a data analytics system, comprising:
    storing a plurality of sequential data blocks in a block cache, each data block containing one or more data records, each data record containing one or more values and a record marker marking the end of the data record;
    allocating a data block in the block cache to a worker thread;
    parsing, by the worker thread, the data block to identify the one or more data records contained within the data block;
    determining whether the data block was correctly parsed; and
    providing the one or more data records contained within the data block to a data analytics workflow executing on the data analytics system responsive to determining that the data block was correctly parsed.

2. The method of claim 1, wherein storing the plurality of sequential data blocks in the block cache comprises:
    issuing a plurality of input/output (I/O) requests to a data source, the plurality of I/O requests requesting a plurality of sequentially-ordered data blocks;
    receiving the plurality of sequentially-ordered data blocks from the data source in response to the plurality of I/O requests, wherein the plurality of sequentially-ordered data blocks are received from the data source in an order different than the sequential order of the data blocks; and
    storing the received plurality of sequentially-ordered data blocks in the block cache.

3. The method of claim 2, wherein the plurality of sequentially-ordered data blocks are stored at locations in the block cache determined responsive to the sequential order of the data blocks.

4. The method of claim 1, wherein there are a plurality of worker threads and allocating a data block in the block cache to a worker thread comprises:
    allocating a plurality of data blocks to a plurality of worker threads, the plurality of worker threads adapted to concurrently parse the allocated plurality of data blocks.

5. The method of claim 1, wherein parsing, by the worker thread, the data block to identify the one or more data records contained within the data block comprises:
    scanning the data block to identify a first record marker location within the data block;
    parsing data records in the data block located after the first record marker location; and
    parsing, by the worker thread, a data record in a next sequential data block occurring before a first record marker location within the next sequential data block.

6. The method of claim 1, wherein determining whether the data block was correctly parsed comprises:
    storing an estimated first record marker location of the data block found by the worker thread parsing the data block;
    determining, by another worker thread, a true first record marker location in the data block;
    determining whether the stored estimated first record marker location matches the true first record marker location; and
    determining that the data block was correctly parsed if the stored estimated first record marker location matches the true first record marker location.

7. The method of claim 1, wherein determining whether the data block was correctly parsed comprises:
    storing an estimated first record marker location of the data block, wherein the data block is parsed responsive to the estimated first record marker location;
    determining a true first record marker location in the data block;
    determining whether the stored estimated first record marker location matches the true first record marker location;
    determining that the data block was incorrectly parsed if stored the estimated first record marker location does not match the true first record marker location; and
    re-parsing the data block using the true first record marker location in the data block responsive to determining that the data block was incorrectly parsed.

8. A computer-implemented data analytics system for processing data blocks, comprising:
    a computer processor for executing computer program instructions; and
    a non-transitory computer-readable memory storing computer program instructions executable by the computer processor to perform operations comprising:
        storing a plurality of sequential data blocks in a block cache, each data block containing one or more data records, each data record containing one or more values and a record marker marking the end of the data record;
        allocating a data block in the block cache to a worker thread;
        parsing, by the worker thread, the data block to identify the one or more data records contained within the data block;
        determining whether the data block was correctly parsed; and
        providing the one or more data records contained within the data block to a data analytics workflow executing on the data analytics system responsive to determining that the data block was correctly parsed.

9. The system of claim 8, wherein storing the plurality of sequential data blocks in the block cache comprises:
    issuing a plurality of input/output (I/O) requests to a data source, the plurality of I/O requests requesting a plurality of sequentially-ordered data blocks;
    receiving the plurality of sequentially-ordered data blocks from the data source in response to the plurality of I/O requests, wherein the plurality of sequentially-ordered data blocks are received from the data source in an order different than the sequential order of the data blocks; and storing the received plurality of sequentially-ordered data blocks in the block cache.

10. The system of claim 9, wherein the plurality of sequentially-ordered data blocks are stored at locations in the block cache determined responsive to the sequential order of the data blocks.

11. The system of claim 8, wherein there are a plurality of worker threads and allocating a data block in the block cache to a worker thread comprises:
   allocating a plurality of data blocks to a plurality of worker threads, the plurality of worker threads adapted to concurrently parse the allocated plurality of data blocks.

12. The system of claim 8, wherein parsing, by the worker thread, the data block to identify the one or more data records contained within the data block comprises:
   scanning the data block to identify a first record marker location within the data block;
   parsing data records in the data block located after the first record marker location; and
   parsing, by the worker thread, a data record in a next sequential data block occurring before a first record marker location within the next sequential data block.

13. The system of claim 8, wherein determining whether the data block was correctly parsed comprises:
   storing an estimated first record marker location of the data block found by the worker thread parsing the data block;
   determining, by another worker thread, a true first record marker location in the data block;
   determining whether the stored estimated first record marker location matches the true first record marker location; and
   determining that the data block was correctly parsed if the stored estimated first record marker location matches the true first record marker location.

14. The system of claim 8, wherein determining whether the data block was correctly parsed comprises:
   storing an estimated first record marker location of the data block, wherein the data block is parsed responsive to the estimated first record marker location;
   determining a true first record marker location in the data block;
   determining whether the stored estimated first record marker location matches the true first record marker location;
   determining that the data block was incorrectly parsed if stored the estimated first record marker location does not match the true first record marker location; and
   re-parsing the data block using the true first record marker location in the data block responsive to determining that the data block was incorrectly parsed.

15. A non-transitory computer-readable memory storing executable computer program instructions for processing data blocks in a data analytics system, the instructions executable to perform operations comprising:
   storing a plurality of sequential data blocks in a block cache, each data block containing one or more data records, each data record containing one or more values and a record marker marking the end of the data record;
   allocating a data block in the block cache to a worker thread;
   parsing, by the worker thread, the data block to identify the one or more data records contained within the data block;
   determining whether the data block was correctly parsed; and
   providing the one or more data records contained within the data block to a data analytics workflow executing on the data analytics system responsive to determining that the data block was correctly parsed.

16. The non-transitory computer-readable memory of claim 15, wherein storing the plurality of sequential data blocks in the block cache comprises:
   issuing a plurality of input/output (I/O) requests to a data source, the plurality of I/O requests requesting a plurality of sequentially-ordered data blocks;
   receiving the plurality of sequentially-ordered data blocks from the data source in response to the plurality of I/O requests, wherein the plurality of sequentially-ordered data blocks are received from the data source in an order different than the sequential order of the data blocks; and
   storing the received plurality of sequentially-ordered data blocks in the block cache.

17. The non-transitory computer-readable memory of claim 15, wherein there are a plurality of worker threads and allocating a data block in the block cache to a worker thread comprises:
   allocating a plurality of data blocks to a plurality of worker threads, the plurality of worker threads adapted to concurrently parse the allocated plurality of data blocks.

18. The non-transitory computer-readable memory of claim 15, wherein parsing, by the worker thread, the data block to identify the one or more data records contained within the data block comprises:
   scanning the data block to identify a first record marker location within the data block;
   parsing data records in the data block located after the first record marker location; and
   parsing, by the worker thread, a data record in a next sequential data block occurring before a first record marker location within the next sequential data block.

19. The non-transitory computer-readable memory of claim 15, wherein determining whether the data block was correctly parsed comprises:
   storing an estimated first record marker location of the data block found by the worker thread parsing the data block;
   determining, by another worker thread, a true first record marker location in the data block;
   determining whether the stored estimated first record marker location matches the true first record marker location; and
   determining that the data block was correctly parsed if the stored estimated first record marker location matches the true first record marker location.

20. The non-transitory computer-readable memory of claim 15, wherein determining whether the data block was correctly parsed comprises:
   storing an estimated first record marker location of the data block, wherein the data block is parsed responsive to the estimated first record marker location;
   determining a true first record marker location in the data block;
   determining whether the stored estimated first record marker location matches the true first record marker location;
   determining that the data block was incorrectly parsed if stored the estimated first record marker location does not match the true first record marker location; and re-parsing the data block using the true first record marker location in the data block responsive to determining that the data block was incorrectly parsed.

\* \* \* \* \*